(12) United States Patent
Wu

(10) Patent No.: US 9,599,392 B2
(45) Date of Patent: Mar. 21, 2017

(54) FOLDING APPROACH TO CREATE A 3D VACUUM INSULATED DOOR FROM 2D FLAT VACUUM INSULATION PANELS

(71) Applicant: Whirlpool Corporation, Benton Harbor, MI (US)

(72) Inventor: Guolian Wu, St. Joseph, MI (US)

(73) Assignee: Whirlpool Corporation, Benton Harbor, MI (US)

(*) Notice: Subject to any disclaimer, the term of this patent is extended or adjusted under 35 U.S.C. 154(b) by 180 days.

(21) Appl. No.: 14/187,622

(22) Filed: Feb. 24, 2014

(65) Prior Publication Data

US 2015/0241112 A1 Aug. 27, 2015

(51) Int. Cl.
*F25D 23/02* (2006.01)

(52) U.S. Cl.
CPC ........... *F25D 23/02* (2013.01); *F25D 23/028* (2013.01); *F25D 2201/14* (2013.01); *Y02B 40/34* (2013.01); *Y10T 29/49826* (2015.01)

(58) Field of Classification Search
CPC ...... F25D 23/02; F25D 23/028; F25D 23/063; F25D 2201/14; F25D 2323/061; F25D 11/00; Y02B 40/34; Y02B 80/12; Y10T 29/49826; Y10T 428/231; Y10T 428/2419; Y10T 428/24264; Y10T 29/49359; F25C 5/005; F25C 5/007; F25C 2400/04; E04B 1/803; B23P 15/26; B29C 53/00; F16L 59/065
USPC .................................. 29/428; 52/784.1, 455
See application file for complete search history.

(56) References Cited

U.S. PATENT DOCUMENTS

| | | |
|---|---|---|
| 948,541 A | 2/1910 | Coleman |
| 1,275,511 A | 8/1918 | Welch |
| 2,108,212 A | 2/1938 | Schellens |
| 2,128,336 A | 8/1938 | Torstensson |
| 2,164,143 A | 6/1939 | Munters |
| 2,318,744 A | 5/1943 | Brown |
| 2,356,827 A | 8/1944 | Coss |
| 2,439,602 A | 4/1948 | Heritage |
| 2,439,603 A | 4/1948 | Heritage |
| 2,538,780 A | 1/1951 | Hazard |
| 2,559,356 A | 7/1951 | Hedges |
| 2,768,046 A | 10/1956 | Evans |
| 2,817,123 A | 12/1957 | Jacobs |
| 2,942,438 A | 6/1960 | Schmeling |
| 2,985,075 A | 5/1961 | Knutsson-Hall |

(Continued)

FOREIGN PATENT DOCUMENTS

| | | |
|---|---|---|
| CA | 1320631 C | 7/1993 |
| CA | 2259665 A1 | 1/1998 |
| CA | 2640006 A1 | 8/2007 |
| CN | 1158509 C | 7/2004 |
| CN | 1970185 A | 5/2007 |
| CN | 100359272 C | 1/2008 |
| CN | 101437756 A | 5/2009 |
| CN | 201680116 U | 12/2010 |
| CN | 102296714 A | 12/2011 |

(Continued)

OTHER PUBLICATIONS

Claim Translation—JP 2010-071565, Apr. 2010.*

(Continued)

*Primary Examiner* — David Bryant
*Assistant Examiner* — Steven A Maynard

(57) ABSTRACT

An appliance door includes a vacuum insulated structure having a plurality of core sections that are folded to form an ice and/or water dispensing cavity on an outer side of the appliance door. The vacuum insulated door structure may be positioned between an outer door member and a door liner.

20 Claims, 7 Drawing Sheets

(56) References Cited

U.S. PATENT DOCUMENTS

| | | |
|---|---|---|
| 3,086,830 A | 4/1963 | Malia |
| 3,125,388 A | 3/1964 | Costantini et al. |
| 3,137,900 A | 6/1964 | Carbary |
| 3,218,111 A | 11/1965 | Steiner |
| 3,258,883 A | 7/1966 | Campanaro et al. |
| 3,358,059 A | 12/1967 | Snyder |
| 3,379,481 A | 4/1968 | Fisher |
| 3,635,536 A | 1/1972 | Lackey et al. |
| 3,688,384 A | 9/1972 | Mizushima et al. |
| 4,006,947 A * | 2/1977 | Haag .............. B65D 81/3823 220/592.1 |
| 4,043,624 A | 8/1977 | Lindenschmidt |
| 4,050,145 A | 9/1977 | Benford |
| 4,067,628 A | 1/1978 | Sherburn |
| 4,325,734 A | 4/1982 | Burrage et al. |
| 4,332,429 A | 6/1982 | Frick et al. |
| 4,417,382 A | 11/1983 | Schilf |
| 4,548,196 A | 10/1985 | Torobin |
| 4,660,271 A | 4/1987 | Lenhardt |
| 4,671,909 A | 6/1987 | Torobin |
| 4,671,985 A | 6/1987 | Rodrigues et al. |
| 4,745,015 A | 5/1988 | Cheng et al. |
| 4,777,154 A | 10/1988 | Torobin |
| 4,805,293 A | 2/1989 | Buchser |
| 4,917,841 A | 4/1990 | Jenkins |
| 5,007,226 A | 4/1991 | Nelson |
| 5,018,328 A | 5/1991 | Cur et al. |
| 5,033,636 A | 7/1991 | Jenkins |
| 5,066,437 A | 11/1991 | Barito et al. |
| 5,082,335 A | 1/1992 | Cur et al. |
| 5,118,174 A | 6/1992 | Benford et al. |
| 5,157,893 A | 10/1992 | Benson et al. |
| 5,175,975 A | 1/1993 | Benson et al. |
| 5,212,143 A | 5/1993 | Torobin |
| 5,221,136 A | 6/1993 | Hauck et al. |
| 5,248,196 A | 9/1993 | Lynn et al. |
| 5,252,408 A | 10/1993 | Bridges et al. |
| 5,263,773 A | 11/1993 | Gable et al. |
| 5,273,801 A | 12/1993 | Barry et al. |
| 5,318,108 A | 6/1994 | Benson et al. |
| 5,340,208 A | 8/1994 | Hauck et al. |
| 5,353,868 A | 10/1994 | Abbott |
| 5,359,795 A | 11/1994 | Mawby et al. |
| 5,397,759 A | 3/1995 | Torobin |
| 5,418,055 A | 5/1995 | Chen et al. |
| 5,433,056 A | 7/1995 | Benson et al. |
| 5,477,676 A | 12/1995 | Benson et al. |
| 5,507,999 A | 4/1996 | Copsey et al. |
| 5,509,248 A | 4/1996 | Dellby et al. |
| 5,512,345 A | 4/1996 | Tsutsumi et al. |
| 5,562,154 A | 10/1996 | Benson et al. |
| 5,586,680 A | 12/1996 | Dellby et al. |
| 5,632,543 A | 5/1997 | McGrath et al. |
| 5,640,828 A | 6/1997 | Reeves et al. |
| 5,643,485 A | 7/1997 | Potter et al. |
| 5,652,039 A | 7/1997 | Tremain et al. |
| 5,716,581 A | 2/1998 | Tirrell et al. |
| 5,813,454 A | 9/1998 | Potter |
| 5,827,385 A | 10/1998 | Meyer et al. |
| 5,843,353 A | 12/1998 | De Vos et al. |
| 5,866,228 A | 2/1999 | Awata |
| 5,868,890 A | 2/1999 | Fredrick |
| 5,900,299 A | 5/1999 | Wynne |
| 5,924,295 A | 7/1999 | Park |
| 5,985,189 A | 11/1999 | Lynn et al. |
| 6,094,922 A | 8/2000 | Ziegler |
| 6,109,712 A | 8/2000 | Hayworth et al. |
| 6,128,914 A | 10/2000 | Tamaoki et al. |
| 6,132,837 A | 10/2000 | Boes et al. |
| 6,158,233 A | 12/2000 | Cohen et al. |
| 6,164,030 A | 12/2000 | Dietrich |
| 6,220,473 B1 | 4/2001 | Lehman et al. |
| 6,221,456 B1 | 4/2001 | Pogorski et al. |
| 6,224,179 B1 | 5/2001 | Wenning et al. |
| 6,260,377 B1 | 7/2001 | Tamaoki et al. |
| 6,305,768 B1 | 10/2001 | Nishimoto |
| 6,390,378 B1 | 5/2002 | Briscoe, Jr. et al. |
| 6,406,449 B1 | 6/2002 | Moore et al. |
| 6,408,841 B1 | 6/2002 | Hirath et al. |
| 6,415,623 B1 | 7/2002 | Jennings et al. |
| 6,460,955 B1 | 10/2002 | Vaughan et al. |
| 6,623,413 B1 | 9/2003 | Wynne |
| 6,716,501 B2 | 4/2004 | Kovalchuk et al. |
| 6,749,780 B2 | 6/2004 | Tobias |
| 6,773,082 B2 | 8/2004 | Lee |
| 6,858,280 B2 | 2/2005 | Allen et al. |
| 6,938,968 B2 | 9/2005 | Tanimoto et al. |
| 7,026,054 B2 | 4/2006 | Ikegawa et al. |
| 7,210,308 B2 | 5/2007 | Tanimoto et al. |
| 7,284,390 B2 | 10/2007 | Van Meter et al. |
| 7,296,432 B2 | 11/2007 | Müller et al. |
| 7,316,125 B2 | 1/2008 | Uekado et al. |
| 7,343,757 B2 | 3/2008 | Egan et al. |
| 7,449,227 B2 | 11/2008 | Echigoya et al. |
| 7,625,622 B2 | 12/2009 | Teckoe et al. |
| 7,641,298 B2 | 1/2010 | Hirath et al. |
| 7,762,634 B2 | 7/2010 | Tenra et al. |
| 7,815,269 B2 | 10/2010 | Wenning et al. |
| 7,842,269 B2 | 11/2010 | Schachtely et al. |
| 7,861,538 B2 | 1/2011 | Welle et al. |
| 7,886,559 B2 | 2/2011 | Hell et al. |
| 7,893,123 B2 | 2/2011 | Luisi |
| 7,908,873 B1 | 3/2011 | Cur et al. |
| 7,930,892 B1 | 4/2011 | Vonderhaar |
| 8,113,604 B2 | 2/2012 | Olson et al. |
| 8,117,865 B2 | 2/2012 | Allard et al. |
| 8,163,080 B2 | 4/2012 | Meyer et al. |
| 8,176,746 B2 | 5/2012 | Allard et al. |
| 8,202,599 B2 | 6/2012 | Henn |
| 8,281,558 B2 | 10/2012 | Hiemeyer et al. |
| 8,299,545 B2 | 10/2012 | Chen et al. |
| 8,343,395 B2 | 1/2013 | Hu et al. |
| 8,353,177 B2 | 1/2013 | Adamski et al. |
| 8,456,040 B2 | 6/2013 | Allard et al. |
| 8,528,284 B2 | 9/2013 | Aspenson et al. |
| 8,739,567 B2 | 6/2014 | Junge |
| 8,752,918 B2 | 6/2014 | Kang |
| 8,770,682 B2 | 7/2014 | Lee et al. |
| 8,852,708 B2 | 10/2014 | Kim et al. |
| 2002/0168496 A1 | 11/2002 | Morimoto et al. |
| 2003/0008100 A1 | 1/2003 | Horn |
| 2004/0178707 A1 | 9/2004 | Avendano et al. |
| 2004/0180176 A1 | 9/2004 | Rusek, Jr. |
| 2004/0253406 A1 | 12/2004 | Hayashi et al. |
| 2005/0235682 A1 | 10/2005 | Hirai et al. |
| 2006/0076863 A1 | 4/2006 | Echigoya et al. |
| 2006/0201189 A1 | 9/2006 | Adamski et al. |
| 2006/0263571 A1 | 11/2006 | Tsunetsugu et al. |
| 2007/0001563 A1 | 1/2007 | Park et al. |
| 2007/0099502 A1 | 5/2007 | Ferinauer et al. |
| 2007/0157653 A1* | 7/2007 | Sasaki ................ B65D 11/18 62/371 |
| 2007/0176526 A1 | 8/2007 | Gomoll et al. |
| 2008/0300356 A1 | 12/2008 | Meyer et al. |
| 2008/0309210 A1 | 12/2008 | Luisi et al. |
| 2009/0056367 A1 | 3/2009 | Neumann |
| 2009/0058244 A1 | 3/2009 | Cho et al. |
| 2009/0113925 A1 | 5/2009 | Korkmaz |
| 2009/0179541 A1 | 7/2009 | Smith et al. |
| 2009/0324871 A1 | 12/2009 | Henn |
| 2010/0231109 A1 | 9/2010 | Matzke et al. |
| 2010/0293984 A1 | 11/2010 | Adamski et al. |
| 2010/0295435 A1 | 11/2010 | Kendall et al. |
| 2011/0030894 A1 | 2/2011 | Tenra et al. |
| 2011/0146325 A1 | 6/2011 | Lee |
| 2011/0146335 A1 | 6/2011 | Jung et al. |
| 2011/0165367 A1 | 7/2011 | Kojima et al. |
| 2011/0206876 A1* | 8/2011 | Fujimori ............ F16L 59/065 428/34.1 |
| 2011/0241513 A1 | 10/2011 | Nomura et al. |
| 2011/0241514 A1 | 10/2011 | Nomura et al. |
| 2011/0260351 A1 | 10/2011 | Corradi et al. |
| 2011/0290808 A1 | 12/2011 | Bai et al. |
| 2011/0315693 A1 | 12/2011 | Cur et al. |

(56) References Cited

U.S. PATENT DOCUMENTS

| | | |
|---|---|---|
| 2012/0000234 A1 | 1/2012 | Adamski et al. |
| 2012/0103006 A1 | 5/2012 | Jung et al. |
| 2012/0104923 A1 | 5/2012 | Jung et al. |
| 2012/0118002 A1 | 5/2012 | Kim et al. |
| 2012/0137501 A1 | 6/2012 | Allard et al. |
| 2012/0152151 A1 | 6/2012 | Meyer et al. |
| 2012/0196059 A1* | 8/2012 | Fujimori ............... F16L 59/065 428/34.1 |
| 2012/0231204 A1 | 9/2012 | Jeon et al. |
| 2012/0237715 A1 | 9/2012 | McCracken |
| 2012/0273111 A1 | 11/2012 | Nomura et al. |
| 2012/0279247 A1 | 11/2012 | Katu et al. |
| 2012/0285971 A1 | 11/2012 | Junge et al. |
| 2012/0297813 A1 | 11/2012 | Hanley et al. |
| 2012/0324937 A1 | 12/2012 | Adamski et al. |
| 2013/0068990 A1 | 3/2013 | Eilbracht et al. |
| 2013/0111941 A1 | 5/2013 | Yu et al. |
| 2013/0255304 A1 | 10/2013 | Cur et al. |
| 2013/0256318 A1 | 10/2013 | Kuehl et al. |
| 2013/0256319 A1 | 10/2013 | Kuehl et al. |
| 2013/0257256 A1 | 10/2013 | Allard et al. |
| 2013/0257257 A1 | 10/2013 | Curr et al. |
| 2013/0264439 A1 | 10/2013 | Allard et al. |
| 2013/0270732 A1 | 10/2013 | Wu et al. |
| 2013/0305535 A1 | 11/2013 | Cur et al. |
| 2014/0132144 A1 | 5/2014 | Kim et al. |
| 2014/0171578 A1 | 6/2014 | Meyer et al. |
| 2014/0260332 A1 | 9/2014 | Wu |
| 2015/0027628 A1 | 1/2015 | Cravens et al. |
| 2015/0147514 A1 | 5/2015 | Shinohara et al. |
| 2015/0168050 A1 | 6/2015 | Cur et al. |

FOREIGN PATENT DOCUMENTS

| | | | |
|---|---|---|---|
| CN | 102452522 A | 5/2012 | |
| CN | 102720277 A | 10/2012 | |
| CN | 103072321 A | 5/2013 | |
| CN | 203331442 U | 12/2013 | |
| DE | 1150190 B | 6/1963 | |
| DE | 19818890 A1 | 11/1999 | |
| DE | 19915311 A1 | 10/2000 | |
| DE | 102009046810 A | 5/2009 | |
| DE | 102008026528 A1 | 12/2009 | |
| DE | 102010024951 A1 | 12/2011 | |
| DE | 102012223536 A1 | 6/2014 | |
| DE | 102012223541 A1 | 6/2014 | |
| EP | 0260699 A2 | 3/1988 | |
| EP | 0480451 A1 | 4/1992 | |
| EP | 0691518 A1 | 10/1996 | |
| EP | 0860669 A1 | 8/1998 | |
| EP | 1087186 A2 | 3/2001 | |
| EP | 1200785 A1 | 5/2002 | |
| EP | 1243880 A1 | 9/2002 | |
| EP | 1496322 A1 | 1/2005 | |
| EP | 1505359 A1 | 2/2005 | |
| EP | 1484563 B1 | 1/2008 | |
| EP | 2342511 A2 | 7/2011 | |
| EP | 2607073 A2 | 6/2013 | |
| EP | 2789951 A1 | 10/2014 | |
| FR | 2980963 A1 | 4/2013 | |
| GB | 837929 A | 6/1960 | |
| GB | 1214548 A | 12/1970 | |
| JP | 59191588 U | 6/1983 | |
| JP | 03013779 A | 1/1991 | |
| JP | 06159922 A | 6/1994 | |
| JP | 7001479 A | 1/1995 | |
| JP | 07167377 | 4/1995 | |
| JP | 08300052 | 11/1996 | |
| JP | 08303686 A | 11/1996 | |
| JP | 09166271 A1 | 6/1997 | |
| JP | 10113983 A | 5/1998 | |
| JP | 11311395 A | 11/1999 | |
| JP | 11336990 A | 12/1999 | |
| JP | 2000097390 A | 4/2000 | |
| JP | 2000117334 A | 4/2000 | |
| JP | 2001038188 A | 2/2001 | |
| JP | 2001116437 A | 4/2001 | |
| JP | 2001336691 A | 12/2001 | |
| JP | 2001343176 A | 12/2001 | |
| JP | 03478771 B2 | 12/2003 | |
| JP | 2004303695 A | 10/2004 | |
| JP | 2005114015 A | 4/2005 | |
| JP | 2005164193 A | 6/2005 | |
| JP | 2005256849 A | 9/2005 | |
| JP | 2006077792 A | 3/2006 | |
| JP | 2006161945 | 6/2006 | |
| JP | 03792801 B2 | 7/2006 | |
| JP | 2007263186 A | 10/2007 | |
| JP | 4828353 B2 | 3/2008 | |
| JP | 4111096 B2 | 7/2008 | |
| JP | 2008157431 A | 7/2008 | |
| JP | 2009063064 A | 3/2009 | |
| JP | 2009162402 A | 7/2009 | |
| JP | 2009524570 A | 7/2009 | |
| JP | 2010017437 A | 1/2010 | |
| JP | 2010-071565 * | 4/2010 | ............ F25D 23/02 |
| JP | 2010071565 A | 4/2010 | |
| JP | 2010108199 A | 5/2010 | |
| JP | 2010145002 A | 7/2010 | |
| JP | 4545126 B2 | 9/2010 | |
| JP | 2010236770 A | 10/2010 | |
| JP | 2010276309 A | 12/2010 | |
| JP | 2011002033 A | 1/2011 | |
| JP | 2011069612 A | 4/2011 | |
| JP | 04779684 B2 | 9/2011 | |
| JP | 2011196644 A | 10/2011 | |
| JP | 2012026493 A | 2/2012 | |
| JP | 04897473 B2 | 3/2012 | |
| JP | 2012063029 A | 3/2012 | |
| JP | 2012087933 A | 5/2012 | |
| JP | 2012163258 A | 8/2012 | |
| JP | 2012189114 A | 10/2012 | |
| JP | 2012242075 A | 12/2012 | |
| JP | 2013002484 A | 1/2013 | |
| JP | 5157777 B2 | 3/2013 | |
| JP | 2013050242 A | 3/2013 | |
| JP | 2013088036 A | 5/2013 | |
| JP | 2013195009 A | 9/2013 | |
| KR | 20020057547 A | 7/2002 | |
| KR | 20040000126 A | 1/2004 | |
| KR | 20080103845 A | 11/2008 | |
| KR | 1017776 B1 | 2/2011 | |
| KR | 20120007241 A | 1/2012 | |
| KR | 2012046621 A | 5/2012 | |
| KR | 2012051305 A | 5/2012 | |
| WO | 9849506 A1 | 11/1998 | |
| WO | 03089729 A1 | 10/2003 | |
| WO | 2007085511 A1 | 8/2007 | |
| WO | 2009147106 A1 | 12/2009 | |
| WO | 2010029730 A1 | 3/2010 | |
| WO | 2010043009 A2 | 4/2010 | |
| WO | 2010092627 A1 | 8/2010 | |
| WO | 2010127947 A2 | 11/2010 | |
| WO | 2011003711 A2 | 1/2011 | |
| WO | 2011058678 A1 | 5/2011 | |
| WO | 2011081498 A2 | 7/2011 | |
| WO | 2012023705 A | 2/2012 | |
| WO | 2012023705 A2 | 2/2012 | |
| WO | 2012031885 A1 | 3/2012 | |
| WO | 2012043990 A2 | 4/2012 | |
| WO | 2012044001 A2 | 4/2012 | |
| WO | 2012026715 A3 | 6/2012 | |
| WO | 2012119892 A1 | 9/2012 | |
| WO | 2014038150 A1 | 3/2014 | |
| WO | 2014095542 A1 | 6/2014 | |
| WO | 2014184393 A1 | 11/2014 | |

OTHER PUBLICATIONS

Description Translation—JP 2010-071565, Apr. 2010.*

European Search Report, Application No. 4158615.6, Jun. 24, 2015, 5 pages.

(56) References Cited

OTHER PUBLICATIONS

International Search Report and Written Opinion of the International Searching Authority for International Application No. PCT/US2013/036203, dated Jul. 26, 2013, 10 pages.
European Search Report for European Patent Application No. EP14158608, dated Nov. 12, 2014, 5 pages.
BASF, "Balindur™ Solutions for fixing Vaccum Insulated Panels," web page, 4 pages, http://performance-materials.basf.us/products/view/family/balindur, at least as early as Dec. 21, 2015.
BASF, "Balindur™," web page, 2 pages, http://product-finder.basf.com/group/corporate/product-finder/en/brand/BALINDUR, at least as early as Dec. 21, 2015.
PU Solutions Elastogram, "Balindur™ masters the challenge," web page, 2 pages, http://product-finder.basf.com/group/corporate/product-finder/en/literature-document:/Brand+Balindur-Flyer—Balindur+The+new+VIP+fixation+technology-English.pdf, Dec. 21, 2014.
International Patent Application No. PCT/US2013036203, International Search Report, Jul. 26, 2013, 10 pages.
European Patent Application No. 14158608.1, Search Report, Sep. 30, 2014, 5 pages.
European Patent Application No. 13775196.2, Supplemental Search Report, Dec. 7, 2015, 6 pages.
European Patent Application No. 15154577.9, Search Report, Jul. 20, 2015, 8 pages.
European Patent Application No. 15153481, Search Report, Jul. 10, 2015, 6 pages.
European Patent Application No. 14158619, Search Report, Jun. 9, 2015, 9 pages.

\* cited by examiner

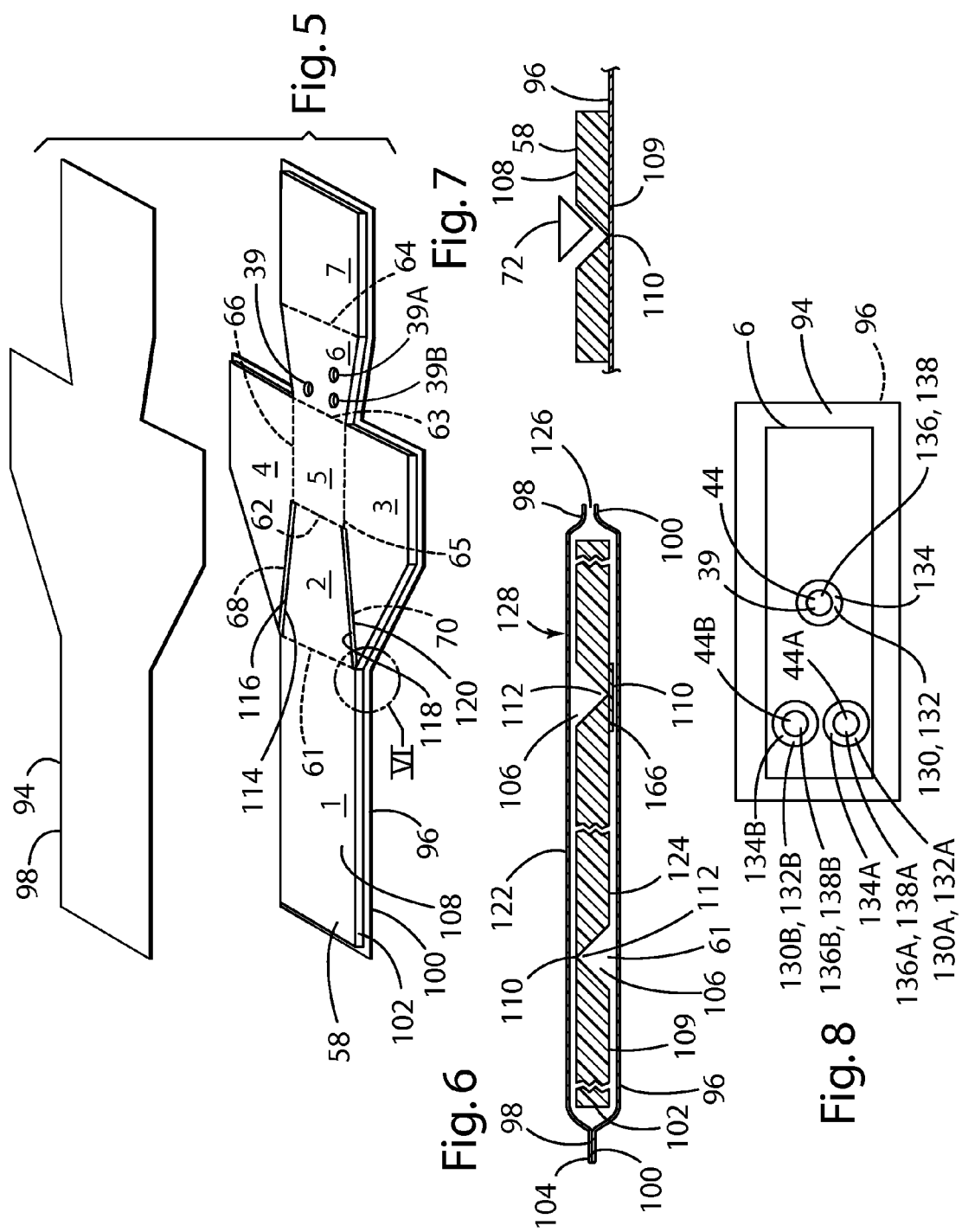

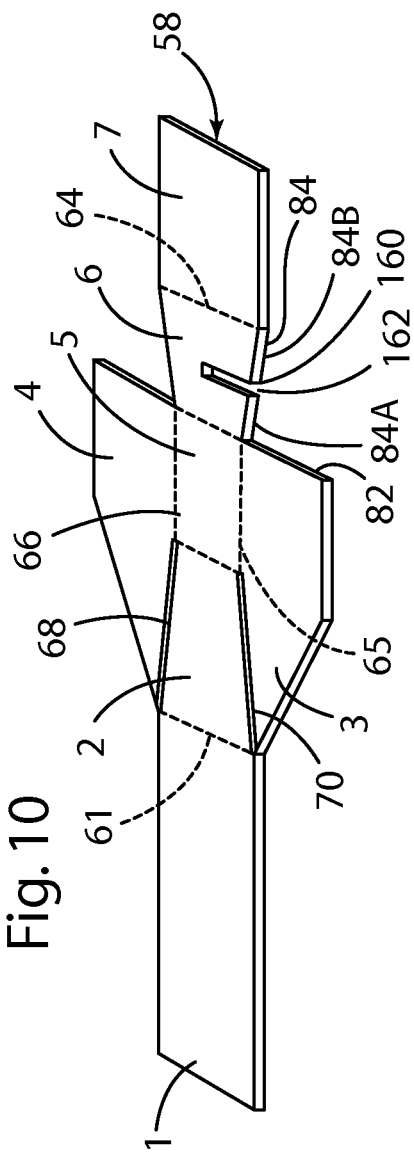
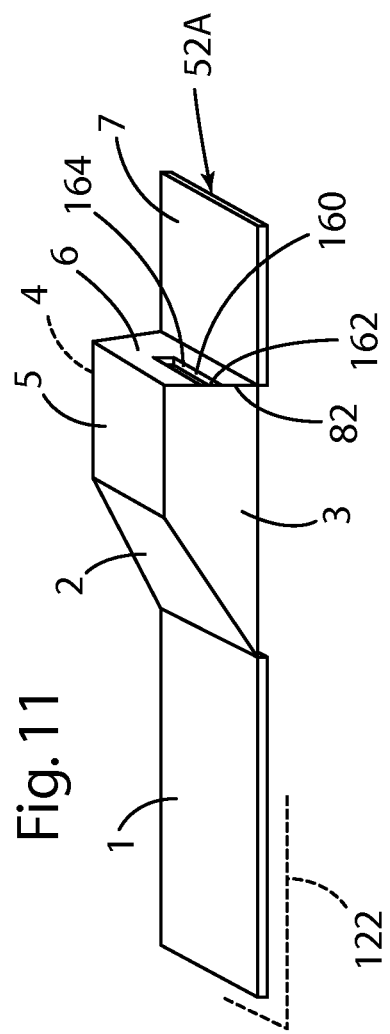

FOLDING APPROACH TO CREATE A 3D VACUUM INSULATED DOOR FROM 2D FLAT VACUUM INSULATION PANELS

CROSS-REFERENCE TO RELATED APPLICATIONS

This application is related to copending U.S. patent application Ser. No. 14/187,640, entitled "VACUUM PACKED 3D VACUUM INSULATED DOOR STRUCTURE AND METHOD THEREFOR USING A TOOLING FIXTURE" filed on even date herewith, the entire contents of which are incorporated by reference.

BACKGROUND OF THE INVENTION

Various types of insulated cabinet and door insulated structures have been developed for refrigerators, freezers, and other such appliances. Insulated appliance door and cabinet structures may include polyurethane foam or other insulating material that is positioned between an outer door skin or wrapper and an inner door liner. However, known insulated appliance structures may suffer from various drawbacks.

BRIEF SUMMARY OF THE INVENTION

One aspect of the present invention is a method of making a vacuum insulated appliance door having an outwardly opening dispensing cavity for dispensing ice and/or liquid water. The method includes providing a first core material board corresponding to an upright lower portion of an appliance door below a dispensing cavity of an appliance door. The method further includes providing a second core material board corresponding to an inwardly extending lower side of a dispensing cavity of an appliance door. Third and fourth core material boards are also provided. The third and fourth core material boards correspond to upright opposite sides of a dispensing cavity of an appliance door. The method further includes providing a fifth core material board corresponding to an upright inner side of a dispensing cavity of an appliance door, and providing a sixth core material board corresponding to an inwardly extending upper side of a dispensing cavity of an appliance door. The sixth core material board may have an opening therethrough. The method also includes providing a seventh core material board corresponding to an upright upper portion of an appliance door above a dispensing cavity of an appliance door. The core material boards may comprise separate pieces, or they may comprise sections of a single piece of core material board that has a plurality of V-shaped grooves formed between adjacent boards to define fold lines. The first, second, third, fourth, fifth, sixth, and seventh core material boards are positioned adjacent one another inside an envelope to form a generally flat subassembly. The envelope is formed from substantially impermeable barrier material, having at least one opening. The generally flat subassembly is positioned in a vacuum chamber, and a vacuum is formed in the vacuum chamber. The opening of the envelope is sealed while the flat subassembly is in the vacuum chamber to thereby form a vacuum inside the envelope. The generally flat subassembly is removed from the vacuum chamber, and the first and second core material boards are folded relative to one another. The third core material board is folded relative to a selected one of the second and fifth core material boards, and the fourth core material board is folded relative to a selected one of the second and fifth core material boards. The fifth and sixth core material boards are folded relative to one another, and the sixth and seventh core material boards are also folded relative to one another. The core material boards may be folded in any order, and may also be folded simultaneously. The folded core material boards form a three dimensional vacuum insulated structure having a dispensing cavity defined by the second, third, fourth, fifth, and sixth core material boards, an upright lower portion below the dispensing cavity defined by the first core material board, and an upright upper portion above the dispensing cavity defined by the first core material board, and an upright upper portion above the dispensing cavity defined by the seventh core material board. The method further includes positioning an ice and/or liquid water dispensing unit adjacent the sixth core material board whereby, in use, ice and/or water from the dispensing unit travels downwardly through the opening through the sixth core material board. The method further includes providing an outer door skin and a door liner. The three dimensional vacuum insulated structure is positioned between the outer door skin and the door liner. The outer door skin is connected to the door liner to form an appliance door.

Another aspect of the present invention is a method of making a vacuum insulated appliance door having an outwardly opening dispensing cavity for dispensing ice and/or liquid water. The method includes providing a plurality of core material boards. The plurality of core material boards are positioned in an envelope defining an inside and having at least one opening to the inside. The envelope comprises substantially impermeable barrier material, whereby the core material boards and the envelope form a generally flat subassembly. Each core material board is foldably interconnected to at least one adjacent core material board along a fold line. The generally flat subassembly is positioned in a vacuum to evacuate the inside of the envelope, and the opening of the envelope is sealed to form a vacuum inside the envelope. The core material boards are folded relative to one another to form a three dimensional vacuum insulated structure having a dispensing cavity with an opening and five sides defined by core material boards. The three dimensional vacuum insulated structure further includes upright lower and upper portions below and above, respectively, the opening of the dispensing cavity. The method further includes positioning the three dimensional vacuum insulated structure between a door liner and an outer door skin. An access opening is formed through at least one of the core material boards defining the dispensing cavity, and a dispensing unit is positioned above the dispensing cavity whereby ice and/or liquid water from the dispensing unit travels through the access opening.

According to another aspect of the present invention, the core material boards may be folded prior to positioning the subassembly in a vacuum.

BRIEF DESCRIPTION OF THE DRAWINGS

In the drawings:

Figures 3, 4:
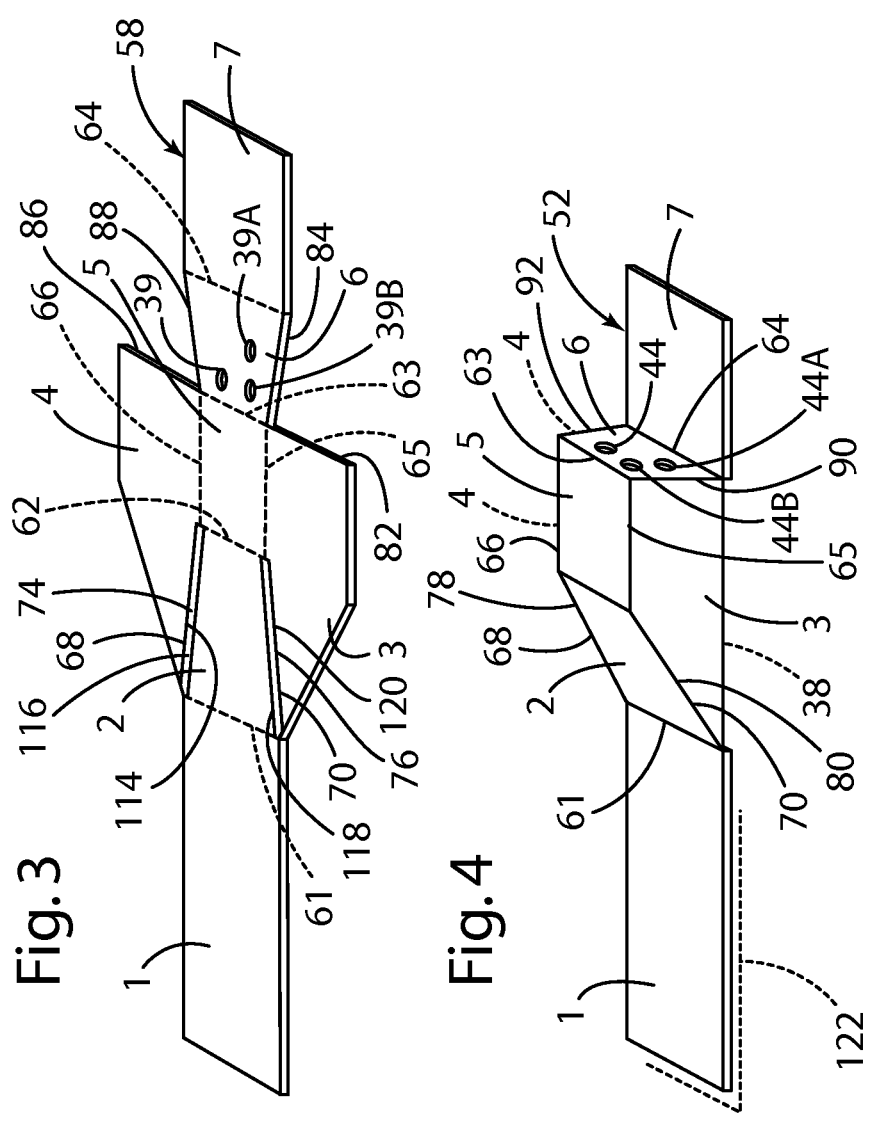

FIG. 3 is a partially schematic isometric view showing a flat core material board structure prior to folding;

FIG. 4 is a partially schematic isometric view of a three dimensional vacuum insulated structure formed by folding the core material boards of FIG. 3;

FIG. 5 is an exploded isometric view of the components of a generally flat subassembly including core material boards and sheets of barrier material prior to assembly;

FIG. 6 is a partially fragmentary cross sectional view of a flat subassembly including core material boards having V-shaped grooves defining fold lines between adjacent core material boards;

FIG. 7 is partially schematic view showing a forming tool utilized to form the V-shaped grooves;

FIG. 8 is partially schematic view of a core material board having an opening that permits ice and/or liquid water from a dispensing unit to pass through the vacuum insulated structure;

FIG. 10 is a partially schematic isometric view of a flat subassembly including a plurality of core material boards according to another aspect of the present invention; and FIG. 11 is a partially schematic isometric view of the core material board subassembly of FIG. 10 after it has been folded to form a three dimensional vacuum insulated structure.

DETAILED DESCRIPTION

Figure 1:
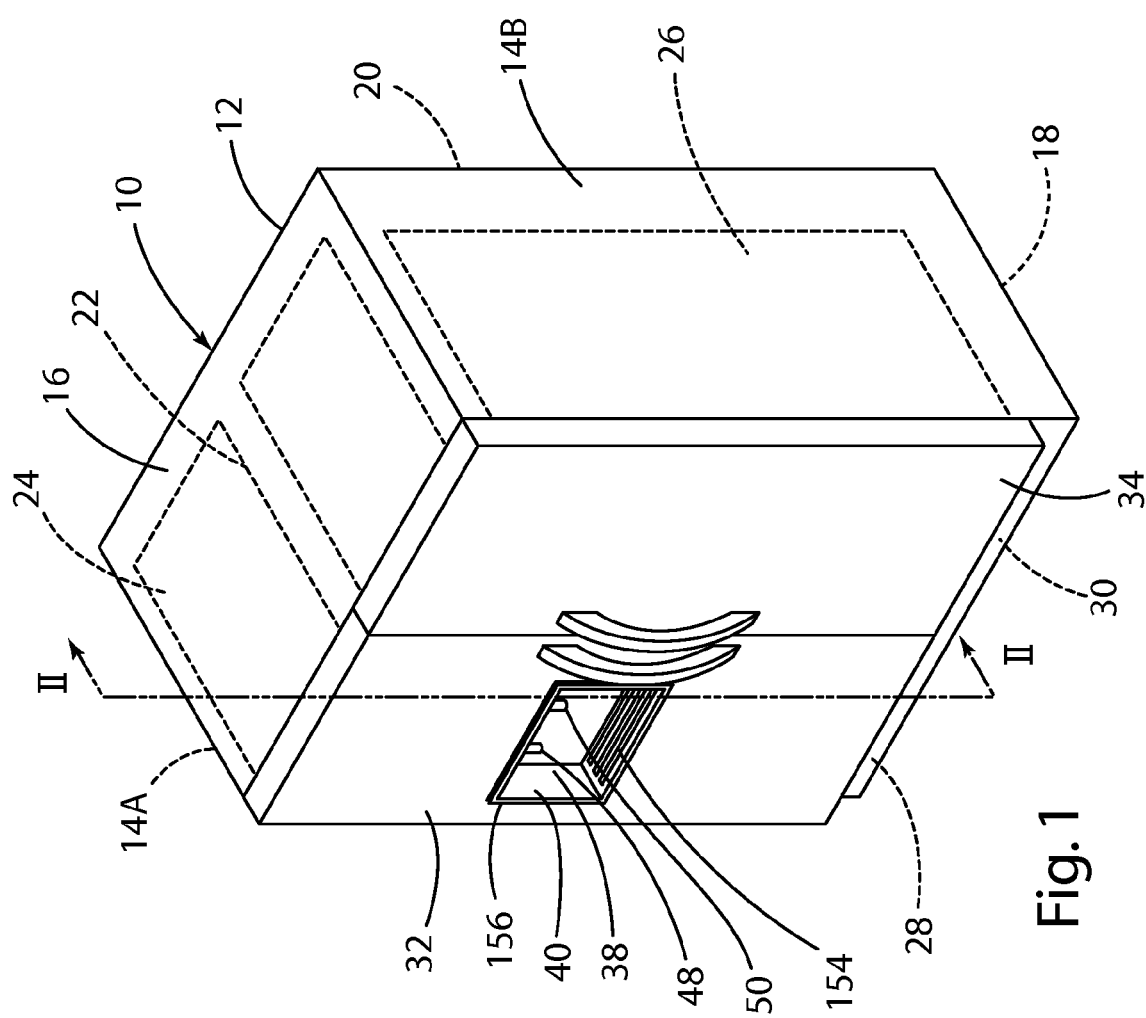
FIG. 1 is an isometric view of a refrigerator including a door having a three dimensional vacuum insulated structure forming a cavity for an ice and/or water dispensing unit according to one aspect of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
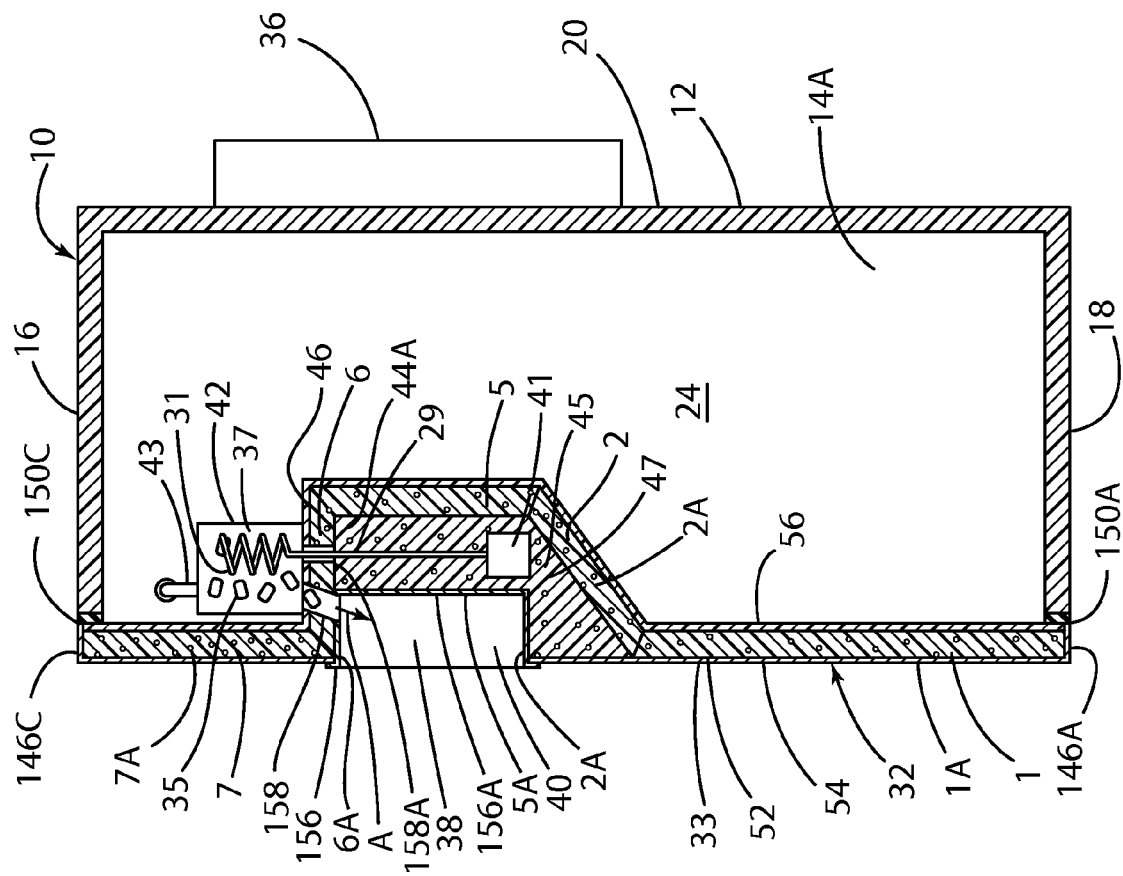
FIG. 2 is a cross sectional view of the refrigerator of FIG. 1 taken along the line II-II.

With reference to FIGS. 1 and 2, an appliance such as a refrigerator 10 includes a cabinet 12 having upright sidewalls 14A and 14B, an upper sidewall 16, a lower sidewall 18, and a rear sidewall 20. The refrigerator 10 may further include an internal vertical divider wall 22 whereby the cabinet 12 defines a freezer compartment 24 and a fresh food compartment 26 with openings 28 and 30 that can be closed off by a vacuum insulated freezer door 32 and a fresh food door 34. A refrigeration unit 32 (FIG. 2) provides chilled air to the freezer compartment 24 and fresh food compartment 26 to maintain desired temperatures therein. The refrigeration unit 36 may comprise a thermoelectric refrigeration unit, or it may comprise a known refrigeration system including a compressor, condenser, and evaporator. Various types of refrigeration systems are known to those skilled in the art, and the refrigeration system 32 will therefore not be described in detail.

Referring again to FIG. 2, freezer door 32 includes a three dimensional vacuum insulated core structure 52 that is disposed between an outer door skin or wrapper 54 and an inner door liner 56. As discussed below, the vacuum insulated core structure 52 provides insulation such that door 32 does not need to include insulating foam injected between wrapper 54 and liner 56.

The freezer door 32 also includes a dispenser housing 156 forming a dispensing cavity 38 having a vertical opening 40 that opens outwardly. An ice and/or liquid water dispensing unit 42 is positioned above the dispensing cavity 38 such that, in use, ice and/or liquid water "A" (FIG. 2) produced by the dispensing unit 42 travels downwardly through an opening 44 in a horizontal vacuum insulated upper sidewall 6A extending across the top of dispensing cavity 38. A user can thereby obtain ice and/or liquid water from dispensing outlets or units 48 and 50, respectively (FIG. 1) without opening freezer door 32. Dispensing unit 42 and units/outlets 48 and 50 may be substantially similar to known components. Dispensing unit 42 may include an ice receptacle or bucket 37 that receives and stores pieces or cubes of ice 35. An output shaft 29 of an electric motor 41 is connected to an auger 31 disposed in ice bucket 37. Electric motor 41 may be positioned between three dimensional vacuum insulated core structure 52 and dispenser housing 156 in a cavity or space 45 that is filled with insulating foam 47. Actuation of electric motor 41 causes auger 31 to rotate and break up/move ice 35 to thereby cause ice 35 to be dispensed through opening 44 to ice dispenser 48. Output shaft 29 extends through an opening 44A in upper sidewall 6A. It will be understood that the dispensing cavity 38 and/or dispensing unit 42 may also be positioned in fresh food door 34 or other appliance door as required for a particular application.

With further reference to FIG. 3, the three dimensional vacuum insulated structure 52 is formed from a board structure 58 that is initially flat. The flat board structure 58 comprises core insulation material such as fumed silica, glass fibers, open cell foams, aerogels or other suitable material. Suitable core materials for forming vacuum insulated structures are known in the art. The flat board structure 58 comprises a plurality of core material board sections 1-7 that are foldably interconnected along a plurality of fold lines 61-66. Core material board 1 may comprise a first core material board, and core material board 2 may comprise a second core material board. Similarly, core material boards 3-7 may comprise third, fourth, fifth, sixth, and seventh core material boards, respectively. However, it will be understood that the terms "first", "second", "third", "fourth", "fifth", "sixth", "seventh" and similar terms are not necessarily limited to the core material boards having the shapes, sizes, positions, and orientations shown in FIGS. 1-11. Sixth core material board 6 may include a plurality of apertures 39, 39A, and 39B that provide for openings 44, 44A, etc. as may be required to provide for dispensing of ice and water (FIG. 2) and for shaft 29.

As discussed below, the core material boards 1-7 are positioned inside an envelope 122 formed from impermeable barrier film, and the core material boards 1-7 are folded along fold lines 61-66 to form a three dimensional vacuum insulated structure 52 as shown in FIG. 4. With further reference to FIGS. 6 and 7, the fold lines 61-66 may be formed by pressing a V-shaped forming tool into the board material of the flat board structure 58, whereby the core material boards are foldably interconnected by a region 110 of compressed material at the bases 112 of V-shaped grooves 106. Alternatively, the core material boards 1-7 may comprise individual pieces of core material board that are positioned directly adjacent one another prior to folding.

Figure 3A:
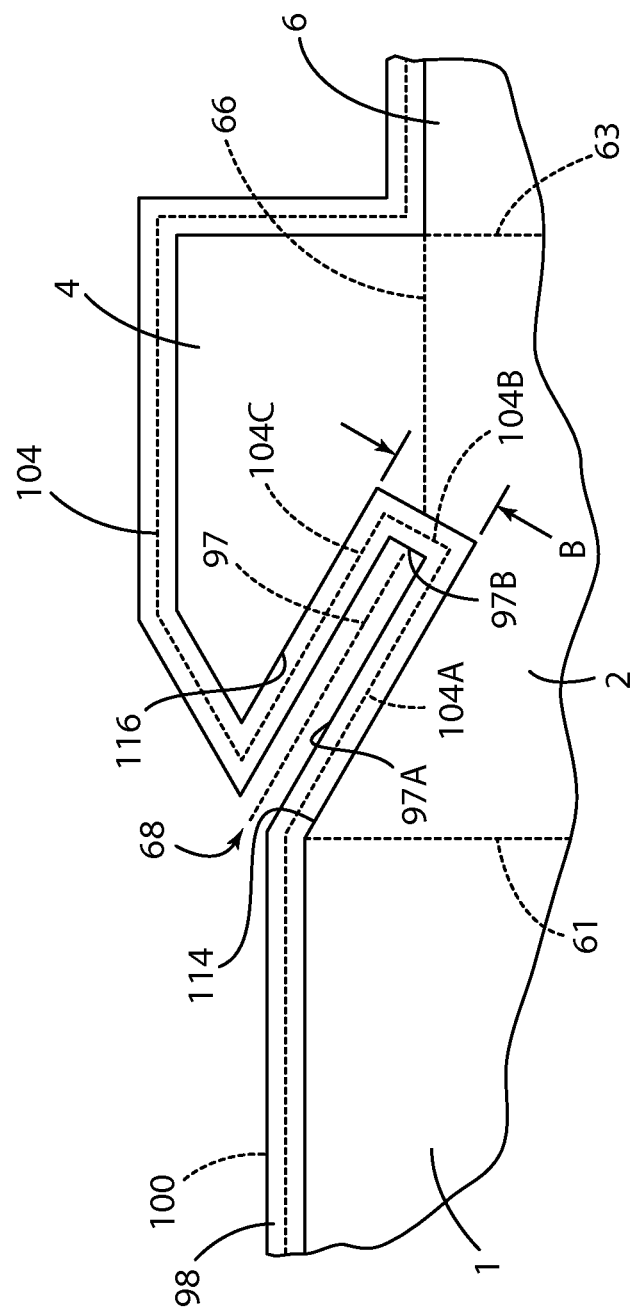
FIG. 3A is a fragmentary, enlarged plan view of a portion of the flat core material board structure of FIG. 3.

Referring to FIGS. 3 and 3A, if the flat board structure 58 is formed from a single piece of core material board, open seams 68 and 70 may be formed by cutting the board material with a saw or the like along the lines 74 and 76 to form spaced apart open board edges 114 and 116 along open seam 68 (FIG. 3A), and open edges 118 and 120 along open seam 70. The edges 114 and 116 may be beveled such that edges 114 and 116 fit closely together after folding. Edges 118 and 120 may also be beveled to provide a close fit upon folding. Open seams 68 and 70 permit folding of the core material boards 1-7 into the three dimensional vacuum insulated structure 52 of FIG. 4. When folded (FIG. 4), the open seams 68 and 70 extend along the corners 78 and 80 where the second core material board 2 meets the third and fourth core material boards 3 and 4. Also, when folded, the edges 82 and 86 of core material board sections 3 and 4, respectively are disposed immediately adjacent the opposite edges 84 and 88 of core material board 6 to thereby form open seams 90 and 92 (FIG. 4) of three dimensional vacuum insulated structure 52. It will be understood that some open seams are typically required to form the three dimensional vacuum insulated structure 52 of FIG. 4. However, the open seams do not necessarily have to be configured as shown in FIGS. 3 and 4. For example, the board material could be cut at the dashed fold lines 65 and 66, and V-grooves 106 could be formed along the lines 68 and 70 to permit folding of board 58 into the three dimensional vacuum insulated structure 52 (FIG. 4). The size, shape, and location of the open seams will depend on the shape of the three dimensions.

With further reference to FIGS. 5 and 6, during fabrication the flat board structure 58 is positioned on a sheet 96 of barrier film. An upper barrier film 94 is then positioned over the flat board structure 58. Perimeter edge portions 98 and 99 of the barrier films 94 and 96, respectively, preferably extend outwardly beyond the edges 102 of the core material boards 1-7 in an overlapping manner. Edge portions 98 and 100 of the barrier films 94 and 60, respectively, are heat sealed together along heat seal line 104 (FIG. 6) utilizing a heated wire or other known heat sealing tool (not shown) to form an envelope 122. A portion of edges 98 and 100 are initially not heat sealed to thereby form an opening 126 (FIG. 6) in envelope 122 that can be utilized to evacuate gasses from inside envelope 122. The barrier films 94 and 96 may comprise a laminate including a nylon exterior layer for mechanical strength, polyester (PET), metalized PET, aluminum foil, and/or linear low-density polyethylene (LLDPE). The LLDPE forms an airtight seam 104 when the edges 98 and 100 are pressed together utilizing heat-sealing tools (not shown). Various barrier films and sealing methods are known in the art, such that a detailed discussion of these features is not believed to be required. The barrier films 94 and 96 together form an envelope 122 having an inside space 124 that can be evacuated to form a vacuum. The core material boards 1-7 are generally made of a porous, rigid material that retains its shape as envelope 122 is pulled against the core material boards 1-7 due to forming a vacuum inside envelope 122.

Referring again to FIG. 3A, as discussed above, the core material board is cut to form open seams 68 and 70. The open seam 68 forms edges 114 and 116 of boards 2 and 4, respectively. The edges 114 and 116 are spaced apart to form a gap "B". Depending upon the type of saw or other tool utilized to cut the board material, the gap "B" may be relatively small (e.g. 0.050 inches), or the gap "B" may be somewhat larger (e.g. 0.50 inches). In FIG. 3A the size of the gap "B" relative to the other components is exaggerated to illustrate the shape of the heat seal line 104 in the vicinity of the open edge 68. It will be understood that the shapes/sizes of the other components such as core material board sections 1, 2, 4, and 6 are also distorted somewhat in FIG. 3A for purposes of illustration. The barrier films 94 and 96 overlap each other in the region of the gap "B". Heat seal segments 104A, 104B, 104C can be formed in the gap "B", and the films 94 and 96 can be cut along a line 97. Alternatively, the films 94 and 96 can be cut to form edge portions 97A, 97B, and 97C. In general, the heat seal seam sections 104A-104C form an elongated U-shaped seam that extends around the cut 97. The heat seal sections 104A-104C are preferably formed prior to cutting the films 94 and 96 along the line 97. If the gap "B" is relatively small, the heat seal line segments 104A-104C can be formed utilizing relatively thin heated wire segments such that the heat seal segments 104A and 104C are spaced apart a relatively small distance (e.g. 0.030 inches). A similar heat seal configuration can be utilized at open seam 70 (FIG. 3), or at any other open seams that may be required for a particular application. The heat seal segments 104A-104C ensure that the flat board structure 58 can be sealed inside envelope 122 to form a vacuum insulated structure.

The fold lines 61-66 (FIG. 5) may comprise V-shaped grooves 106 that are formed utilizing a V-shaped forming tool 72 (FIG. 7) that is pressed into upper surface 108 and/or lower surface 109 of flat board structure 58. A small "bridge" 110 of compressed material 110 may be formed at the base 112 of each groove 106 to thereby foldably interconnect adjacent core material boards 1-7. In the illustrated example, grooves 106 are formed in upper surface 108 to form fold lines 61 and 63, and V-shaped grooves 106 are formed in lower surface 109 at fold lines 62, 63, 65, and 66.

V-shaped grooves 106 can be formed by initially positioning the flat board structure 58 upside down on a fixture or other support surface (not shown) with lower surface 109 facing inwardly. The tool 72 can then be pressed into lower surface 109. The flat board structure 58 can then be turned over and positioned on lower barrier film 96, and forming tool 72 can then be pressed into upper surface 108 of flat board structure 58. The upper barrier film 94 can then be positioned over the flat board structure 58, and the edges 98 and 100 of barrier films 94 and 96 can then be heat sealed together to form a seam 104 and seam sections 104A, 104B, and 104C. As discussed above, at least a portion of the edges 98 and 100 are initially not sealed together to thereby form an opening 126 (FIG. 6) in envelope 122. The core material boards 1-7 and envelope 122 form a generally flat subassembly 128 that is then positioned in a vacuum chamber. A vacuum is then formed around the subassembly 128, and the opening 126 is closed by heat-sealing while the subassembly 128 is in a vacuum. The flat subassembly 128 is then removed from the vacuum chamber, and the core material boards 1-7 are then folded relative to one another to form a three dimensional vacuum insulated structure 52 as shown in FIG. 4. Tape (not shown) may be applied along open seams 68, 70, 90, and 92 to seal the seams.

First core material board 1 is folded relative to second core material board 2 along fold line 61, and second and fifth core material boards 2 and 5 are folded relative to one another along fold line 62. When folded, second and fifth core material boards 2 and 5, respectively, are disposed at an angle between 90° and 180°, preferably about 120° to 150°. It will be understood that the shape of the V-shaped groove 106 forming fold line 62 may be configured such that the angled edge surfaces forming groove 106 fit tightly together after folding. Fifth and sixth core material boards 5 and 6, respectively, are folded relative to one another along fold line 63, sixth and seventh core material boards 6 and 7, respectively, are folded relative to one another along fold line 64, and third and fourth core material boards 3 and 4, respectively, are folded relative to fifth core material board 5 along fold lines 65 and 66, respectively. The core material boards 1-7 may be folded in any order, or they may be folded simultaneously. Thus, it will be understood that the terms "first", "second", etc. do not imply or signify a chronological order or sequence.

With further reference to FIG. 8, core material board 6 may include apertures 39, 39A, and 39B through the core board 6. Portions 130 and 132 of barrier films 94 and 96, respectively, overlap at the aperture 39. The overlapping portions 130 and 132 can be heat sealed together to form a seam 134, and center portions 136 and 138 of barrier films 94 and 96, respectively can be cut away to form opening 44 through sixth core material board 6. Similarly, barrier films 94 and 96 can be heat sealed at seams 134A and 134B at apertures 39A and 39B to form openings 44A and 44B, respectively. Openings 44, 44A, 44B permit ice and/or liquid water from dispenser 42 (FIG. 2) to pass through vacuum insulated structure 52 at core material board 6, and also permit shaft 29 to pass through vacuum insulated structure 52. The size, shape, and number of openings 44, 44A, etc. can be adjusted as required for a particular application. For example, opening 44 may be quite large, such that the shaft 29 and ice and water all pass through opening 44.

Figure 9:
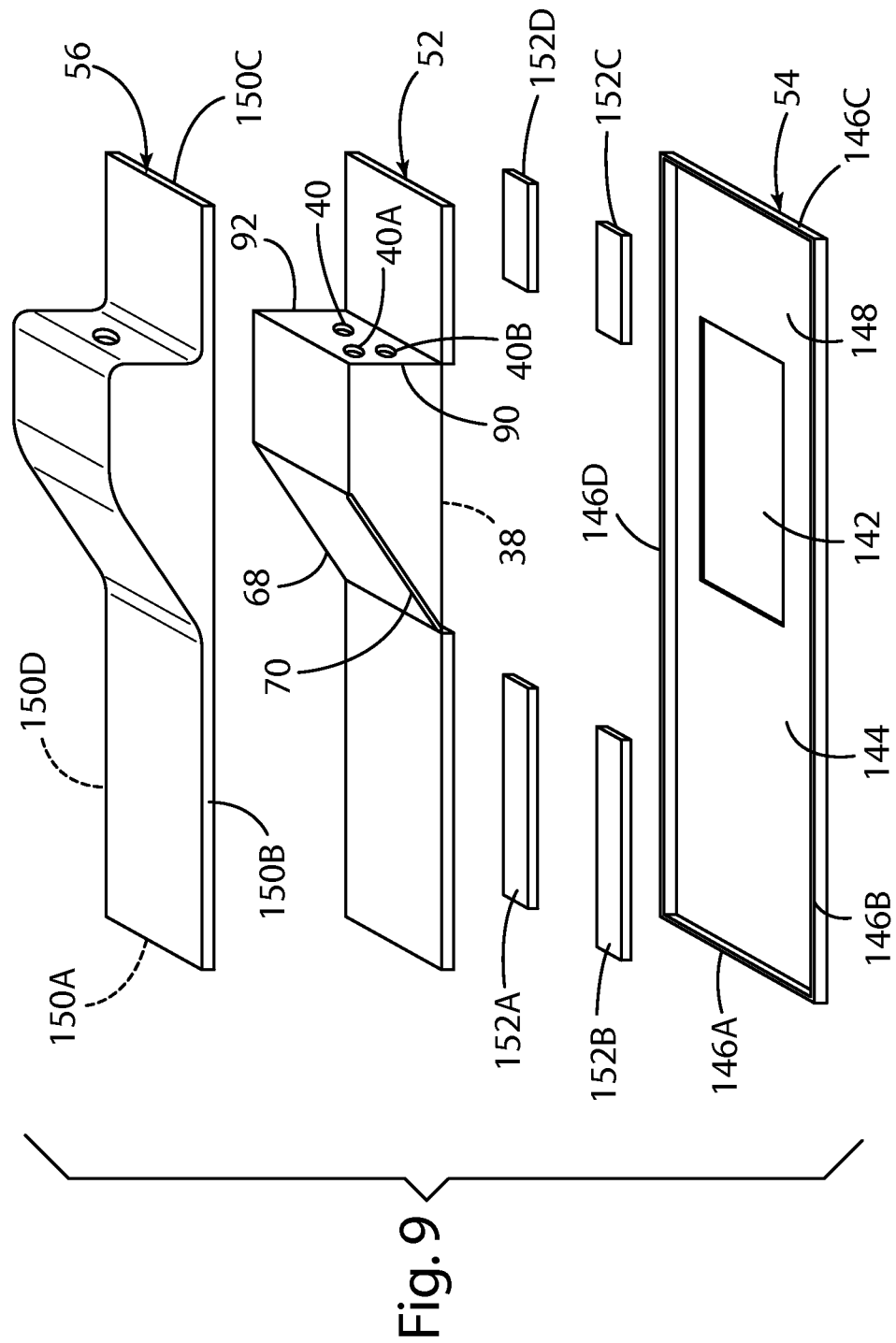
FIG. 9 is an exploded isometric view showing assembly of a vacuum insulated appliance door according to one aspect of the present invention.

With further reference to FIG. 9, after the core material boards 1-7 are folded to form three dimensional vacuum insulated structure 52, tape may (optionally) be positioned along the open seams 68, 70, 90, and 92. The three dimensional folded insulating structure 52 is positioned between outer door skin or cover 54 and inner door liner 56. The outer door skin/cover 54 may be formed from sheet metal or other suitable material. The outer door skin/cover 54 may be configured as required for a particular application, and generally includes an opening 142 that receives dispenser housing 156 to form opening 40 (FIG. 2) to provide access to dispensing cavity 38 of door 32. The outer door skin or cover 54 may include a flat main portion 144 and transverse flanges 146A-146D that together form a shallow cavity 148.

The liner 56 may be formed from thermoplastic polymer materials or the like utilizing known processes. The liner 56 may include edge portions 150A-150D that are configured to connect to the flanges 146A-146D of outer door skin 54 in a known manner. In general, the outer door skin/cover 54 and liner 56 may be constructed utilizing known materials and techniques previously utilized in connection with insulated appliance doors having conventional foam insulation that is injected between outer door skins and inner door liners.

When assembled, the outer door skin/cover 54 is secured to door liner 56 with the three dimensional vacuum insulated structure 52 positioned between the outer door skin/cover 54 and door liner 56 as shown in FIG. 2.

Referring again to FIG. 9, a plurality of optional spacers 152A-152D may be positioned between the three dimensional vacuum insulated structure 52 and the outer door skin/cover 54 if required for a particular application. The spacers 152A-152D support the flat main portion 144 of outer door skin/cover 54 to thereby reduce the flexibility of the main portion 144. Additional spacers (not shown) that are similar to spacers 152A-152D may be positioned between the door liner 56 and three dimensional vacuum insulated structure 52 to provide support for inner liner 56. The size, shape, and number of spacers 152 may be varied as required for a particular application. In the illustrated example, the spacers 152A-152D comprise strips of material having generally flat upper and lower surfaces. However, the spacers 152A-152D may be shaped as required to closely fit between the vacuum insulated structure 52 and outer door skin/cover 54 and/or door liner 56. Spacers 152 may be formed from relatively rigid foam, solid polymers, or other suitable material. The spacers 152 may be adhesively bonded to the vacuum insulated structure 52, outer door skin/cover 54, and inner door liner 56.

In general, the outer door skin/cover 54 and inner door liner 56 are configured to fit closely against vacuum insulated structure 52 without gaps, such that spacers 152 may not be required. It will be understood that the gaps between vacuum structure 52 and outer door skin 54 and/or inner door liner 56 shown in FIG. 2 are shown for illustrative purposes only, and such gaps are preferably very small or nonexistent such that spacers 152 are not required.

When assembled, appliance door 32 (FIG. 2) includes a generally upright lower portion 1A corresponding to first core material board 1. The lower portion 1A is disposed below dispensing cavity 38 formed in front side 33 of appliance door 32. The dispensing cavity 38 includes a vertical inner wall 5A and horizontal upper wall 6A. Walls 5A and 6A are formed by dispenser housing 156. Vertical inner wall 54 corresponds to fifth core material board 5, and upper wall 6A corresponds to sixth core material board 6. A lower sidewall 2A formed by dispenser housing 156 corresponds to core material board 2. The dispensing cavity 40 further includes vertically extending sidewalls 3A and 4A formed by dispenser housing 156. Sidewalls 3A and 4A correspond to core material boards 3 and 4, respectively. Sidewalls 3A and 4A of dispensing cavity 38 may taper towards one another such that opening 40 has width that is somewhat greater than the width of vertical inner wall 5A. Referring again to FIG. 3, this shape is accomplished by providing a taper along opposite side edges 84 and 88 of core material board 6 such that fold line 63 is shorter than fold line 64. Similarly, open seams 68 and 70 may be cut at a small angle to taper towards one another such that fold line 62 is shorter than fold line 61. The shape and size of dispensing cavity 38 can be adjusted/formed as required for a particular application by forming the core material boards 1-7 to include the necessary geometry.

In the illustrated example, the sidewalls 2A, 3A, 4A, 5A, and 6A of cavity 38 are formed by dispenser housing 156. However, it will be understood that numerous other structures may be utilized to form sidewalls 2A, 3A, 4A, 5A and/or 6A. For example, outer door skin/cover may be constructed to include integral portions forming one or more of sidewalls 2A, 3A, 4A, 5A and/or 6A, such that a separate dispenser housing 156 is not required.

Dispenser housing 156 may be positioned in opening 38 to provide a finished appearance. Dispenser housing 156 may be shaped somewhat like a shoe box, including a vertical inner sidewall 156A providing a finished interior surface for dispensing cavity 40. Dispenser housing 156 may be molded from a suitable polymer material.

Ice and/or liquid water dispensing unit 42 is secured to door 32, and includes an ice bucket 37 positioned above dispensing cavity 40, and an electric motor 41 disposed adjacent vertical rear wall 5A of cavity 38. In the illustrated example, electric motor 41 is disposed in cavity or space 45 between dispenser housing 156 and fifth core material board 5. Space 45 may be filled with foam insulation 47. Dispensing unit 42, ice bucket 37, motor 41, auger 31, and other related components may be substantially similar to corresponding components of known ice and water dispensing units, and the details of these components will not therefore be described in detail. Dispensing unit 42 may be connected to power and water supplies utilizing utility lines 43 that are routed through hinges (not shown) of door 32 in a known manner. The utility lines 43 may be routed inside of appliance door 32 between the outer door member 54 and the door liner 56, or the lines 43 may be routed outside of door 32. An insert 158 may be positioned in opening 44 to cover the seam 134 (see also FIG. 8) and to provide a passageway for the ice and water dispensers 48 and 50, respectively (FIG. 1).

With further reference to FIGS. 10 and 11, opening 40 may also be formed by providing a slot 160 in sixth core material board 6. The slot 160 may be relatively narrow, with an open end 162 along edge 84 of core material board 6, thereby forming edge portions 84A and 84B on opposite sides of open end 162 of slot 160. The barrier films 94 and 96 may be heat sealed together in the vicinity of slot 160 in substantially the same manner as described in more detail above in connection with FIGS. 3A, 6, and 8. When flat board structure 58A (FIG. 10) is folded to form three dimensional vacuum insulated structure 52A (FIG. 11), the open end 162 of slot 160 is disposed immediately adjacent edge 82 of core material board 3, thereby forming an opening 164. An insert (not shown) similar to insert 158 (FIG. 2) may be positioned in opening 164 to form a passageway that receives dispensers 48 and 50 (FIG. 1).

As discussed above, the fold lines 61-66 may comprise V-shaped grooves 106 formed by a forming tool 72. Alternatively, the core material boards 1-7 may initially comprise separate pieces having beveled edges that are cut at an angle. The beveled edges form V-shaped grooves 106 when the individual core material boards 1-7 are positioned adjacent to one another as shown in FIGS. 5 and 6. Tape 166 (FIG. 6) may optionally be utilized to foldably interconnect the adjacent core material boards 1-7, and the core material boards 1-7 may be positioned in an envelope 122 to form a flat subassembly 128 as described in more detail above. The flat subassembly 128 can then be positioned in a vacuum chamber until the required vacuum level is reached, and the opening 126 can then be heat sealed in the vacuum chamber. The flat subassembly 128 is then folded to form a three dimensional vacuum insulated structure 52 (FIG. 4) or 52A (FIG. 11). The core material boards 1-7 may also be positioned inside of an envelope 122 adjacent one another without taping adjacent core material boards to define fold lines between adjacent core material boards. In this case, the envelope 122 foldably interconnects adjacent core material boards 1-7 to thereby permit folding to form three dimensional vacuum insulated structure 52.

The invention claimed is:

1. A method of making a vacuum insulated appliance door having an outwardly opening dispensing cavity for dispensing ice and/or liquid water, the method comprising:
   providing a first core material board corresponding to an upright lower portion of an appliance door below a dispensing cavity of an appliance door;
   providing a second core material board corresponding to an inwardly extending lower side of a dispensing cavity of an appliance door;
   providing third and fourth core material boards corresponding to upright opposite sides of a dispensing cavity of an appliance door;
   providing a fifth core material board corresponding to an upright inner side of a dispensing cavity of an appliance door;
   providing a sixth core material board corresponding to an inwardly extending upper side of a dispensing cavity of an appliance door, wherein the sixth core material board has an opening therethrough;
   providing a seventh core material board corresponding to an upright upper portion of an appliance door above a dispensing cavity of an appliance door;
   positioning the first, second, third, fourth, fifth, sixth, and seventh core material boards adjacent one another inside an envelope formed from substantially impermeable barrier material to form a generally flat subassembly, wherein the envelope has at least one opening;
   positioning the generally flat subassembly in a vacuum chamber;
   forming a vacuum in the vacuum chamber;
   sealing the opening of the envelope in the vacuum chamber;
   removing the generally flat subassembly from the vacuum chamber;
   folding the first and second core material boards relative to one another;
   folding the third core material board relative to a selected one of the second and fifth core material boards;
   folding the fourth core material board relative to a selected one of the second and fifth core material boards;
   folding the fifth and sixth core material boards relative to one another;
   folding the sixth and seventh core material boards relative to one another;
   wherein the folded core material boards form a three dimensional vacuum insulated structure having a dispensing cavity defined by the second, third, fourth, fifth, and sixth core material boards, an upright lower portion below the dispensing cavity defined by the first core material board, and an upright upper portion above the dispensing cavity defined by the seventh core material board;
   positioning an ice and/or water dispensing unit adjacent the sixth core material board whereby, in use, ice and/or water from the dispensing unit travels downwardly through the opening through the sixth core material board;
   providing an outer door skin;
   providing a door liner;
   positioning the three dimensional vacuum insulated structure between the outer door skin and the door liner; and
   connecting the outer door skin to the door liner to form an appliance door.

2. The method claim 1, wherein:
   the first, second, fifth, sixth, and seventh core material boards are disposed in a row prior to positioning the generally flat subassembly in a vacuum chamber.

3. The method of claim 2, wherein:
   the third and fourth core material boards are positioned on opposite sides of the row prior to positioning the generally flat subassembly in a vacuum chamber.

4. The method of claim 3, including:
   foldably interconnecting the first and second core material boards along a first fold line;
   foldably interconnecting the second and fifth core material boards along a second fold line that is generally parallel to the first fold line;
   foldably interconnecting the fifth and sixth core material boards along a third fold line that is generally parallel to the first and second fold lines; and
   foldably interconnecting the sixth and seventh core material boards along a fourth fold line that is generally parallel to the first, second, and third fold lines.

5. The method of claim 4, including:
foldably interconnecting the fifth and third core material boards along a fifth fold line that is transverse relative to the third fold line; and
foldably interconnecting the fifth and fourth core material boards along a sixth fold line that is transverse relative to the third fold line.

6. The method of claim 5, wherein:
the first, second, third, fourth, fifth, and sixth fold lines comprise V-shaped grooves formed in edge portions of the core material boards.

7. The method of claim 6, wherein:
the first, second, third, fourth, fifth, sixth, and seventh core material boards are formed from a single piece of core material board by pressing a V-shaped forming tool into the single pieces of core material board to form V-shaped grooves defining the fold lines.

8. The method of claim 1, wherein:
the opening through the sixth core material board comprises an elongated U-shaped slot having an open edge portion that opens along a side edge of the sixth core material board prior to folding the core material boards to form the three dimensional vacuum insulated structure.

9. The method of claim 8, wherein:
folding the core material boards includes positioning an edge of either the third or fourth core material boards such that it extends across the open edge portion of the elongated U-shaped slot.

10. The method of claim 1, wherein:
the opening through the sixth core material board comprises a generally circular aperture through the sixth core material board.

11. The method of claim 1, wherein:
folding the core material boards includes positioning the fifth core material board at a right angle relative to the sixth core material board and positioning the seventh core material board at a right angle relative to the sixth core material board.

12. The method of claim 11, wherein:
folding the core material boards includes positioning the third and fourth core material boards transversely relative to the fifth core material board.

13. The method of claim 12, wherein:
folding the core material boards includes positioning the second core material board at an angle in a range of about one hundred and ten degrees to about one hundred and sixty degrees relative to the first core material board.

14. The method of claim 13, including:
forming an open seam between the second core material board and the third core material board that is defined by open edge portions of the second and third core material boards prior to folding the core material boards;
forming an open seam between the second core material board and the fourth core material board that is defined by open edge portions of the second and fourth core material boards prior to folding the core material boards;
positioning the open edge portions of the second and third core material boards directly adjacent one another by folding the second and third material boards directly adjacent one another by folding the second and third core material boards relative to the fifth core material board; and
positioning the open edge portions of the second and fourth core material boards directly adjacent one another by folding the second and fourth core material boards relative to the fifth core material board.

15. A method of making a vacuum insulated appliance door having an outwardly opening dispensing cavity for dispensing ice and/or liquid water, the method comprising:
providing a plurality of core material boards;
positioning the plurality of core material boards in an envelope defining an inside and having at least one opening to the inside, the envelope comprising substantially impermeable barrier material, whereby the core material boards and the envelope form a generally flat subassembly;
foldably interconnecting each core material board to at least one adjacent core material board along a fold line;
forming a vacuum around the generally flat subassembly in a vacuum to evacuate the inside of the envelope;
sealing the at least one opening of the envelope;
folding the core material boards relative to one another to form a three dimensional vacuum insulated structure having a dispensing cavity with an opening and five sides defined by core material boards, the three dimensional vacuum insulated structure further including upright lower and upper portions below and above, respectively, the opening of the dispensing cavity;
positioning the three dimensional vacuum insulated structure between a door liner and an outer door skin;
forming an access opening through at least one of the core material boards, defining the dispensing cavity; and
positioning the dispensing unit that dispenses at least ice and/or liquid water above the dispensing cavity whereby ice and/or liquid water from the dispensing unit travels through the access opening into the dispensing cavity.

16. The method of claim 15, wherein:
providing a plurality of core material boards comprises providing seven core material boards, and wherein:
the generally flat subassembly includes five of the core material boards that are positioned adjacent one another to form a row, and two of the core material boards are positioned on opposite sides of the row.

17. The method of claim 16, wherein:
the row comprises first, second, third, fifth, sixth and seventh core material boards, and wherein the two core material boards positioned on opposite sides of the row comprise third and fourth core material boards; and wherein;
the first and second core material boards are foldably interconnected along a fold line, the second and third core material boards are foldably interconnected along a fold line, the third and fourth core material boards are foldably interconnected along a fold line, the fourth and fifth core material boards are foldably interconnected along a fold line, the fifth and sixth core material boards are foldably interconnected along a fold line, and the sixth and seventh core material boards are foldably interconnected along a fold line.

18. The method of claim 17, wherein:
the third and fifth core material boards are foldably interconnected along a fold line, and the fourth and fifth core material boards are foldably interconnected along a fold line.

19. The method of claim 15, including:
positioning at least one preformed spacer between the three dimensional vacuum insulated structure and the outer door skin.

20. The method of claim 15, wherein:
the fold lines comprise V-shaped grooves that are formed by pressing a V-shaped forming tool into a surface of a sheet of core material board.

* * * * *